Patented June 28, 1938

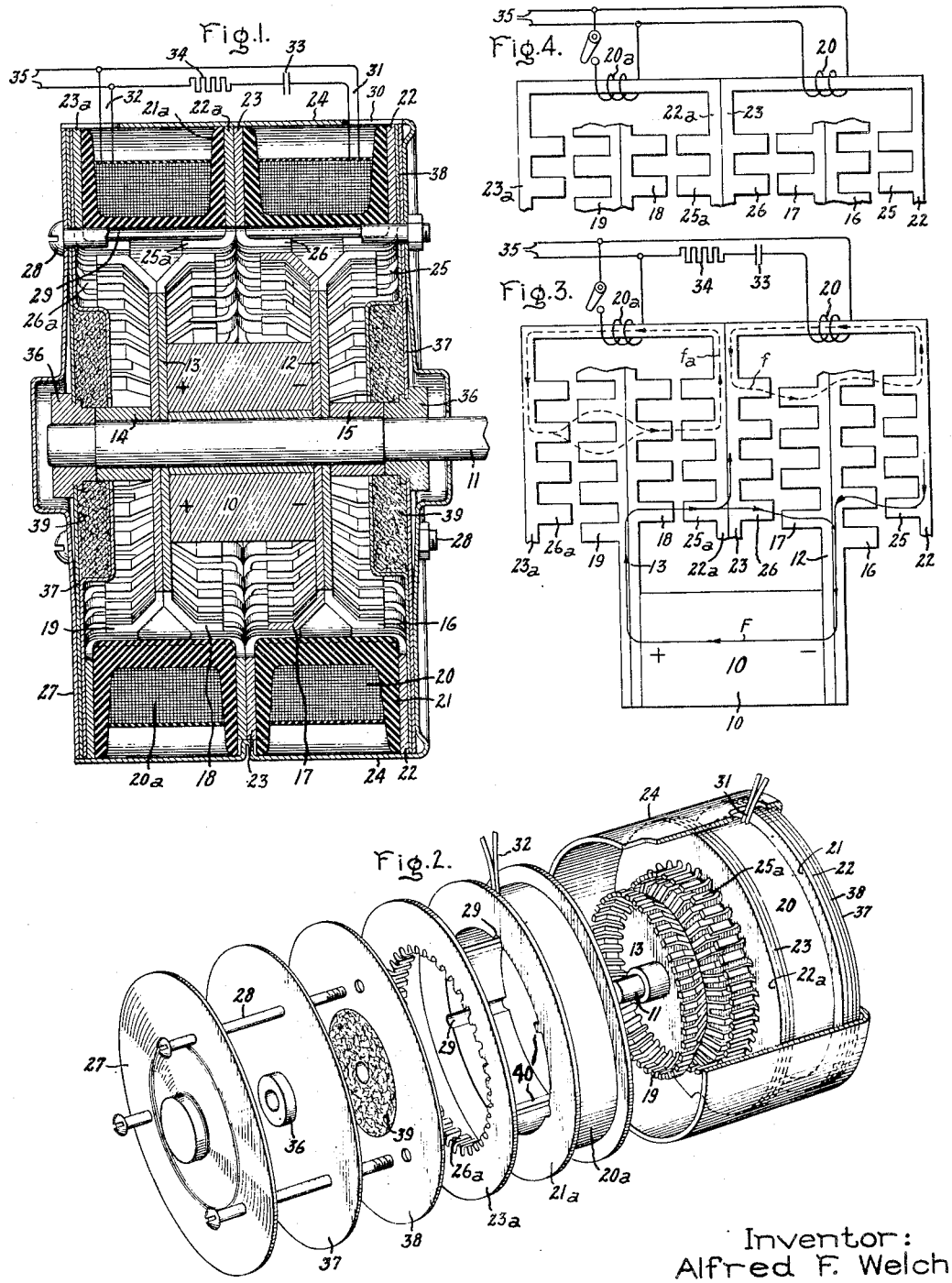

2,122,307

UNITED STATES PATENT OFFICE 2,122,307

TIMER MOTOR

Alfred F. Welch, Fort Wayne, Ind., assignor to General Electric Company, a corporation of New York Application September 8, 1937, Serial No. 162,893

6 Claims. (Cl. 172—275)

My invention relates to synchronous motors of the inductor type and its object is to provide an efficient, low speed, self-starting, quiet operating motor, particularly adapted to be built in fractional horse power sizes, for the operation of timing devices, such for example, as clocks, phonographs and the like.

The motor of this application is in some respects similar in theory of operation to the synchronous inductor motor described in my United States application for Letters Patent, Serial No. 91,941, filed July 22, 1936. The invention concerns primarily novel structural arrangements for such motors.

The features of my invention which are believed to be novel and patentable will be pointed out in the claims appended hereto. For a better understanding of my invention reference is made in the following description to the accompanying drawing in which Fig. 1 shows a sectional view of a motor embodying the present invention taken through the stator and rotor on the axis of rotation; Fig. 2 shows a partially exploded view of the component parts of the motor stator prior to final assembly with a section of the casing cut away; Fig. 3 is a schematic showing of the stator and rotor tooth relationship of a split-phase motor and the magnetic connections between different sections thereof, and Fig. 4 represents schematically the tooth relationship of a motor that will operate in either direction of rotation.

Referring to Figs. 1, 2 and 3, it will be seen that the present motor is made up of two single phase motor elements placed side by side and having a common permanent magnet 10 on the rotor for supplying the unidirectional flux excitation for both elements.

The shaft 11 of the motor passes through a central bore of the cylindrical shaped permanent magnet 10. Abutting against opposite ends of the permanent magnet are magnetic spider elements 12 and 13. Each such spider is shown made up of two disc-shaped plates concentric with and secured to the shaft 11 by bushings 14 and 15. The bushings have a tight fit on the shaft so that when the rotor parts are assembled and the bushings pressed on, the plates of spider elements 12 and 13 and the permanent magnet 10 are securely held to the shaft and in abutting relationship, such that one spider 12 is polarized as a south pole and the other spider 13 as a north pole by the permanent magnet 10. The peripheral edges of the spider elements have evenly spaced teeth cut therein, and the ends of these teeth are bent parallel to the shaft to form four circular axially spaced rows of rotor teeth; the teeth in the outer plate of spider 12 are bent outward to form the row of teeth 16, the teeth of the inner plate of spider 12 are bent inwardly to form the row of rotor teeth 17. At the opposite end of the rotor the teeth of the inner plate of spider element 13 are bent inwardly to form the row of rotor teeth 18, and the teeth in the outer plate of spider element 13 are bent outwardly to form the row of rotor teeth 19. As indicated in the schematic diagram of Fig. 3 the teeth of spider 12 which are bent in the opposite directions are alternately spaced, that is, teeth 16 lie between teeth 17. Fig. 3 is intended to show the spaced relationship between the various teeth in stator and rotor and, whereas actually adjacent, stator and rotor teeth overlap in the axial direction. As shown in Fig. 1 the teeth are shown shorter in Fig. 3 in order to avoid confusion. Also the stator and rotor teeth as seen in Fig. 3 are represented as being laid out on a flat surface, whereas actually they are arranged in cylindrical formation. Likewise teeth 18 and 19 of spider element 13 alternate in staggered relationship. It will further be noted that the teeth 16 and 17 of rotor spider element 12 are shifted ¼ tooth pitch in a given direction with respect to rotor teeth 18 and 19 respectively of rotor spider element 13.

The single phase stator element cooperating with rotor spider element 12 comprises an annular shaped single phase coil 20 on an insulating spool 21 within a partially closed magnetic shell made up of washer shaped plates 22 and 23 and an outer magnetic cup 24. The stator parts form a cylinder about the rotor and are concentric therewith and with its shaft. The coil is incased except at its inner periphery by magnetic material. The plates 22 and 23 have teeth cut in their inner peripheries which teeth are bent towards each other and parallel to the rotor teeth and lie closely adjacent thereto so that aligned rows of stator and rotor teeth are separated by a small concentric air gap. The teeth of plate 22 form the row of stator teeth designated 25 adjacent and opposite the row of rotor teeth 16. The teeth of plate 23 form the row of stator teeth 26 adjacent and opposite rotor teeth 17. The teeth 25 and 26 are separated sufficiently in the axial direction, so that the single phase flux that tends to pass between them, when coil 20 is energized, does so through the adjacent rows of rotor teeth 16 and 17.

The other single phase stator element is similar to the one just described and its corresponding parts are designated by like reference characters followed by the letter a. The outer magnetic shell 24 is common to both stator elements and is in the form of a cup with its end wall to the right in Fig. 1 enclosing that end of the motor. The left end of the motor is enclosed by a suitable cover plate 27.

It will be noted from Fig. 3 that each row of stator teeth have the same pitch or spacing as the teeth in the rotor, but that the stator teeth in all rows 25, 26, 25a and 26a are in axial alignment. So far as operation of the motor is concerned I might align the rotor teeth and offset the stator teeth or provide some intermediate equivalent variation, but I prefer to align the stator teeth in the different rows for mechanical considerations. The chief reason for this is that I provide three or more bolts 28 between the outer end wall plates 27 and 24 of the motor casing to hold all of the parts together in assembled relationship. By axially aligning all of the stator teeth in the various rows these bolts, which are made of non-magnetic material, can be run through the motor assembly and lie in certain aligned slots between the stator teeth in the different rows. At the points where these bolts pass through the motor a groove 29 may be cut in the inner periphery of the insulating spools 21 and 21a, if necessary.

An opening, or openings, 30 are cut in the stator shell 24 to bring out the leads 31 and 32 for the coils 20 and 20a. A condenser 33 or other phase-splitting element is included in the circuit of one coil 20, so that the single phase fluxes of the two motor elements are 90 degrees out of phase. Also included in series with the condenser circuit to coil 20, I have shown a resistance 34. This resistance is not essential but is provided so that both coils 20 and 20a may be made exactly alike and carry the same current values. The circuits for the two coils are connected in parallel to a single phase source 35.

The bearings 36 of the motor are made of porous bronze and are secured by staking them to flexible circular diaphragm plates 37, extending over the ends of the motor, and centered by fitting snug into the casing 24. These diaphragms are supported, except near the bearing, by side plates comprising the end wall of the outer cup member 24, and outer end plate 27, previously mentioned and by inner plates 37. These supporting plates are flared away from the bearings to allow room for the bearings and for oil retaining absorbent pads 39 about the bearings. By reason of the flexibility of the bearing supporting diaphragms 37 adjacent the bearings the latter are self-aligning.

In the construction of the motor, care should be taken to avoid providing a good magnetic circuit through the bearings and adjacent end walls and shaft structure, as this would divert useful flux from the air gap between stator and rotor teeth. To this end the shaft 11 and retaining bushings 14 are made of non-magnetic material. The plates 37 and 38 may likewise be made of non-magnetic material, although this is not essential.

The air gap reluctance of this motor is the same in all rotor positions. For example, in the rotor position represented in Fig. 3, teeth 25a and 18 are in alignment, and ½ of a tooth 17 covers ½ of a tooth 26. Also ½ of a tooth 16 covers ½ of a tooth 25. The tooth area in alignment between stator and rotor is, therefore, the area of ½ of the area of all stator teeth. This is true in any other rotor position as will be evident by considering such area when the rotor is shifted to any other position. The motor, therefore, has no standstill locking tendency due to the rotor attempting to find a position where the reluctance between stator and rotor is less than it is in some other position. Also the stator and rotor tooth area in alignment is always the same in both ends of the motor whatever the rotor position, and hence there is no magnetic unbalance axially of the motor, a feature which is desirable from the standpoint of quiet operation. The path for the flux of the permanent magnet 10 through the rotor is a path of constant reluctance in all rotor positions, and hence there is no tendency for the permanent magnet to become deenergized because of variation in the reluctance of its flux path and hence its flux. This path is represented generally by the full line F, Fig. 3 for the rotor position indicated. The reluctance of the paths for the alternating fluxes produced by the windings 20 and 20a, between stator and rotor, is constant in all rotor positions. These flux paths are represented generally by dotted lines $f$ and $fa$ in Fig. 3. The directions of the arrows on these dotted flux lines have no particular significance, because the alternating fluxes reverse and also have maximum values at different times when the phase-splitting arrangement is employed.

In order to explain the operation of this motor, let it be assumed first that only alternating current coil 20a is energized, and that the right-hand half of the motor then merely serves as a return path for the dc or unidirectional flux. When the ac flux is in the direction represented by the arrows $fa$, it adds with the dc flux between teeth 25a and 18 and subtracts or opposes any dc flux tending to cross between teeth 26a and 18. Under this condition the rotor will thus seek the position shown with teeth 25a and 18 in alignment, and there will be a maximum resultant flux between the latter teeth and a negligible resultant flux between teeth 26a and 19. A half cycle later the ac flux $fa$ reverses, and then the fluxes will add between teeth 26a and 19, and subtract between teeth 25a and 18. The rotor will then tend to move ½ tooth pitch in either direction so as to bring teeth 19 into alignment with teeth 26a.

The motor with only one coil energized is a single phase self-starting synchronous motor operating on the inductor principle, which may start in either direction of rotation, and operates on the same principle as the self-reversing motor described in my copending application Serial No. 91,942, filed July 22, 1936.

If now we consider coil 20a deenergized and only ac coil 20 energized, the right half of the motor combination will comprise a similar self-starting synchronous motor which may start in either direction of rotation. Either end of the motor may be operated alone in this way.

If now both ac coils of the motor be energized simultaneously from the single phase supply 35, the motor will be synchronous and self-starting as before, but will operate in a predetermined direction of rotation, such direction depending upon the relative direction in which the coils 20 and 20a are wound or energized and on the direction of phase shift. Assuming these coils are wound or energized in the same relative direction, the flux of coil 20, which leads the flux of coil 20a by 90 degrees due to condenser 33, will occur in the direction indicated by arrow $f$, 90 electrical degrees time phase before flux *fa* occurs in the direction indicated.

Flux *f*, combining with the dc flux, will align teeth 17 and 26. 90 degrees time phase later *fa* flux will combine with the dc flux to align teeth 18 and 25*a*. 90 degrees time phase later the reversed *f* flux will combine with the dc flux to align teeth 25 and 16, and 90 degrees time phase later reversed *fa* flux will combine with the dc flux to align teeth 26*a* and 19. Owing to the ¼ tooth pitch between the teeth 16 and 18, and between teeth 17 and 19 directional rotation is assured. For example, as described above and as pictured in Fig. 3, flux *fa* is assumed to be at its maximum in the direction indicated causing the alignment of teeth 25*a* and 18. This places teeth 16 nearer teeth 25 in the downward direction of rotor movement than in the upward direction of rotation as visualized in Fig. 3 and hence, since the next effective combined flux pulsation will occur between teeth 25 and 16, the direction of rotation will be downward as indicated. If coil 20 be considered reversed such next effective combined flux pulsation would have occurred between teeth 17 and 26, and direction of rotation would be reversed. Thus we have a self-starting synchronous motor combination consisting of two single phase inductor motors having their unidirectional fluxes supplied by the same permanent magnet. This motor combination will start and operate in a definite direction and this direction of rotation may be reversed by reversing either coil 20 or 20*a*, or by shifting the phase splitting element from one coil to the other. After starting in the desired direction, one of the motor coils 20 or 20*a* may be opened to reduce the input and the motor will continue to operate synchronously in the direction in which it was started. In this case it will be slightly preferable to open coil 20*a* since then the power factor improving benefit of condenser 33 will be utilized. However, it should be realized that the power factor of this motor is inherently high because of the permanent magnet excitation. The motor may also be operated on one coil only, as a self-starting synchronous motor but which will start in either direction, and the direction of rotation may be selected by mechanically blocking rotation in one direction as explained in my application, Serial No. 91,942.

If directional starting is not required the motor parts may be assembled with rotor and stator teeth similarly aligned at both ends of the motor as pictured in Fig. 4, and the two ac coils connected in series or parallel without phase shift. The motor will then be a self-starting synchronous motor which may start in either direction of rotation with both coils energized, and the input may be reduced by opening one coil without changing the motor characteristics except as to torque.

The synchronous speed at which the motor will operate depends upon the frequency and the number of stator and rotor teeth. Increasing the number of teeth reduces the speed, and vice versa. The rotor moves one full tooth pitch per complete cycle at synchronous speed. A motor having 30 teeth in one rotor section will have a synchronous speed of 120 R. P. M. at 60 cycles. The design thus lends itself to considerable flexibility with respect to the features above explained.

While this motor may seem rather complicated and costly to build, it is on the contrary of relatively inexpensive construction. The toothed parts may be stamped and shaped by press punch operations and as shown in Fig. 2 the other parts are relatively simple and most of them may be manufactured in quantity by machine operations and the parts are easy to assemble. Several of the parts used in opposite ends of the motor are exact duplicates. In molding the spools 21 and 21*a*, it is desirable to provide a few inwardly extending splines (see Fig. 2) which fit between the teeth of the stator and serve as a guide in assembly.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States, is,—

1. A split phase synchronous inductor motor comprising two single phase inductor motor elements each comprising a stator and a rotor element, a common shaft on which the rotor elements are mounted, each rotor element comprising a disk-shaped magnetic spider member having the same number of evenly spaced teeth in its periphery with alternate teeth in each element extending axially in opposite directions so as to form two axially displaced circular rows of teeth in each rotor element, a permanent magnet extending between said rotor elements and polarized in an axial direction so as to polarize the two rows of teeth in one rotor element at one magnetic polarity and the two rows of teeth in the other rotor element at the opposite magnetic polarity, the teeth in one rotor element being displaced with respect to the teeth in the other rotor element by ¼ tooth pitch, each stator element comprising a single phase coil concentric with and surrounding the rotor, a magnetic circuit enclosing the outer and side walls of each coil and forming a pair of axially spaced pole pieces at the inner periphery of each such coil, the two pole pieces for each such coil having teeth extending axially towards each other and forming two circular rows of teeth for each stator element opposite and concentric with the two circular rows of teeth of its corresponding rotor element, the number of teeth in the rotor and stator rows being equal and equally spaced, the teeth in all stator rows being in axial alignment, the inner side wall magnetic circuit of one stator element abutting against the inner side wall of the other stator element so as to form a magnetic path axially through the stator, the relative spacing between different rows of teeth in stator and rotor being such that alternating flux passing between the toothed pole pieces of a stator element does so through the teeth of its corresponding rotor element and unidirectional fluxes from the oppositely polarized rotor elements find a return path through the stator, and means for energizing the two stator coils from an alternating current source by currents which are displaced in phase by approximately 90°.

2. A split phase synchronous inductor motor comprising cooperating outer stator and inner rotor members, the rotor member comprising a shaft, a magnetic spider member on opposite ends of said shaft, each such spider element having a pair of axially displaced circular rows of teeth in its periphery, forming four axially displaced circular rows of teeth in all, the number of teeth in each row being equal and equally spaced, the teeth of the pair of rows supported by each spider member being displaced by ½ tooth pitch and the teeth of different spider members being displaced by ¼ tooth pitch, a permanent magnet on the rotor extending between the two spider members and polarizing the teeth of such spider members with opposite magnetic polarities, the stator member comprising magnetic members having toothed inner peripheries to form four circular rows of teeth concentric with and adjacent to the four rows of rotor teeth, the stator teeth in each row being in axial alignment and each row having the same number and spacing as in a circular row of rotor teeth, a single phase coil for producing an alternating flux between the rows of stator teeth which are adjacent the rows of rotor teeth which are of one magnetic polarity and a single phase coil for producing an alternating flux between the rows of stator teeth which are adjacent the rows of rotor teeth which are of the opposite magnetic polarity, means for dephasing the fluxes produced by said coils by approximately 90°, said alternating fluxes passing between stator and rotor through such adjacent rows of stator and rotor teeth, said stator magnetic members forming a magnetic return path for the unidirectional flux from the oppositely polarized rotor parts.

3. In combination, a single phase motor element having outer stator and inner rotor members, the stator member comprising an annular magnetic housing surrounding the rotor, said housing being of channel-shaped cross section with the open side inward facing the rotor, a single phase coil in said housing and surrounding the rotor, a circular row of magnetic teeth formed in each inner edge of said housing, the rotor member comprising a magnetic spider supporting in its periphery two circular rows of teeth, one adjacent each row of stator teeth, the axial spacing of the two rows of teeth in stator and rotor and the air gap spacing between stator and rotor being such that single phase fluxes produced in the stator magnetic circuit by its coil cross between its two rows of teeth by way of the rotor teeth and spider, another similar single phase motor element, a common shaft for the rotor members of said elements, a permanent magnet on said shaft extending between the magnetic spiders thereon and polarizing said spiders and the teeth carried thereby at opposite magnetic polarities, the two stator members being supported end to end with their adjacent magnetic housing structures connected magnetically to provide an axial path through said stators for flux from the permanent magnet between the polarized rotor spiders, the combination thus providing four axially displaced circular rows of stator teeth adjacent to and cooperating with four circular rows of rotor teeth, the number of teeth in each row being equal and equally spaced, the teeth in the stator and rotor of each single phase motor element being so arranged that when the rotor and stator teeth in adjacent rows are opposite each other the stator and rotor teeth in the other adjacent rows are displaced by ½ tooth pitch, means for energizing the two coils of the stator members by currents which are displaced in phase by approximately 90 degrees, the teeth of one single phase motor element being displaced with respect to the teeth in the other single phase motor element by ¼ tooth pitch, said motor combination thus comprising a split phase synchronous inductor motor which is self-starting and having a direction of rotation depending upon the relative direction of phase displacement of the alternating fluxes.

4. A synchronous inductor motor combination comprising two single phase inductor motors, each motor having stator and rotor elements, a common shaft for both rotor elements, each rotor element comprising a pair of disks of magnetic material having their inner portions in face-to-face contact and having teeth formed in their peripheries, the teeth in the two contacting disks extending axially away from each other so as to form two circular rows of teeth axially displaced, the rotor elements being axially displaced on the shaft so that together they support four circular rows of teeth axially displaced, a permanent magnet extending between the two rotor elements and abutting against inner disk portions thereof, and polarized to polarize one rotor element and its two rows of teeth at one magnetic polarity and the other rotor element with its two rows of teeth at the opposite magnetic polarity, each stator element including a single phase coil surrounding the rotor and concentric thereto, a washer-shaped magnetic member on either side of each such coil, said washer-shaped members and the coils being supported within a magnetic shell which is common to both stator elements, the washer-shaped members of the stator having teeth formed in their inner peripheries, which teeth are bent axially to form four circular rows of teeth adjacent to the four rows of rotor teeth and separated therefrom by small concentric air gaps, the teeth in the members on opposite sides of a coil and belonging thereto, extending towards each other, the inner washer-shaped member of one stator element lying in face-to-face contact with the inner washer-shaped member of the other stator element, each of said single phase motors constituting a self-starting synchronous inductor motor and operable as such, one motor constituting a return flux path for the unidirectional flux of the other and vice versa.

5. An inductor motor structure comprising a pair of similar spools of insulating material fitting within said casing, single phase coils on said spools, washer-shaped members of magnetic material fitting within said casing on either side of each spool with their outer peripheries abutting against the inner wall of said casing and having teeth formed at their inner peripheries and forming four axially spaced circular rows of stator teeth, a closure for the open end of said casing, diaphragms fitting within said casing at either end and supporting bearings at their centers, bolts extending axially through said casing between its end walls at the inner peripheries of said spools for holding said parts in assembled relationship, a rotor within said casing having a shaft supported by said bearings, a spider member at either end of said rotor, each spider member comprising a pair of magnetic disks having teeth formed in their peripheries, the teeth in one disk member of a pair being axially spaced from the teeth in the other disk member of such pair so as to form four circular, axially spaced rows of rotor teeth in axial alignment with and closely adjacent to the four circular rows of stator teeth, and a permanent magnet extending between the rotor spider members and polarizing said spider members at opposite magnetic polarities.

6. In combination, a pair of single phase inductor motors having outer magnetic stator members and inner magnetic rotor members, the stator members being supported end to end in a common magnetic shell, a common shaft on which the rotor members are axially spaced, a permanent magnet extending between the rotor members for supplying the necessary unidirectional flux excitation for both motors, such flux passing from rotor to stator in one motor and returning from stator to rotor in the other motor, each motor having the same number of salient pole teeth in stator and rotor so as to have similar synchronous speeds, each of said motors being self-starting but being susceptible of starting in either direction of rotation when energized alone, means for energizing said motors simultaneously by single phase currents which are displaced in phase by approximately 90 degrees, said motors having their teeth relatively displaced by ¼ tooth pitch such that when so energized simultaneously, the combination operates as a split phase synchronous inductor motor which is self-starting in a predetermined direction of rotation.

ALFRED F. WELCH.